Oct. 13, 1964 R. A. WAHRMAN ETAL 3,153,200

TIMED PULSE PROVIDING CIRCUIT

Filed Nov. 14, 1960

United States Patent Office 3,153,200
Patented Oct. 13, 1964

3,153,200

TIMED PULSE PROVIDING CIRCUIT

Robert A. Wahrman, Cheektowaga, Marvin A. Davis, Clarence, and John H. Courcoulas, Cheektowaga, N.Y., assignors to Westinghouse Electric Corporation, East Pittsburgh, Pa., a corporation of Pennsylvania Filed Nov. 14, 1960, Ser. No. 69,085
7 Claims. (Cl. 328—55)

This invention relates to electronic means for propagating and for timing a pair of related pulses or signals which are required to have not only precisely adjusted individual durations but precisely timed relation one to the other.

The object of the invention is to provide a simple and economical circuit operating with great accuracy in its timing responses to provide a pair of synchronized pulses having a predetermined relation one to the other.

In accordance with the present invention, a basic circuit known as a NOR circuit is employed to provide a number of electronic operations. The NOR circuit is fundamentally an inverter normally showing an output signal N and which will respond to an input signal on any one or more of a plurality of input circuits to squelch or suppress the said normal output signal N and change it to a NOT signal $\overline{N}$. This may also be expressed by saying that the normal output of a binary 1 is changed, when the NOR circuit responds to an input signal, to a binary 0 signal.

The NOR circuit consists of a plurality of input circuits connected in parallel to the positively biased base of a grounded emitter PNP transistor whose collector constitutes an output circuit and which is connected through a load resistor to a negative source of current. Thus, when a negative input is applied to any one or more of the said inputs, the normal negative output is squelched and becomes a ground or zero potential signal.

A pair of NOR circuits may be interconnected by connecting the output of each to an input of the other to form a circuit element variously known as a flip-flop, a memory circuit or a bistable circuit. In the form used herein, the flip-flop has two inputs, one designated ON and the other designated OFF. In normal condition the flip-flop has two outputs, a signal and a not signal output. When the flip-flop is operated over its ON input, the signal output assumes the not signal condition and the not signal output assumes the signal condition.

A feature of the present invention resides in the use of a NOR circuit as a time delay element. In accordance with this feature, a capacitor is bridged from the base to the collector of the terminal transistor so that a circuit including the positive bias resistor, the load resistor to the negative battery and the said capacitor, has a definite and a predetermined time constant. By then placing a Zener diode in the output the appearance of a signal on the output may be delayed until the potential on the Zener diode reaches the point where the Zener breakdown occurs.

Another feature of the invention resides in the use of a NOR circuit as the basis for an amplifier. Since the output of the NOR is normally inverted, the use of another transistor in cascade will produce a final outgoing signal corresponding to the input signal and since this final transistor may be a so-called power transistor, the input signal reflected in the output may be amplified.

Another feature of the invention is the use of a flip-flop to respond to the incoming control pulse and having two circuits, one an amplifier and the other a timing circuit connected to the two outputs of the said flip-flop, the amplifier responding to a signal output and the timing circuit simultaneously responding to a not signal. The amplifier thus starts the propagation of an outgoing pulse and the timing device in time acts as a source of an incoming pulse to another combination of flip-flop, amplifier and time delay circuit whereby after a definite and predetermined time interval a second outgoing pulse is propagated. After another such definite and predetermined time interval, the first flip-flop is driven back to normal to stop the operation of the first amplifier and to terminate this first outgoing pulse and a third time delay circuit connected to the not signal output thereof responds and measures the time to the termination of the second outgoing pulse.

Other features will appear hereinafter.

The drawings consist of one sheet having six figures, as follows.

Figures 1, 2, 3, 4, 5, 6:
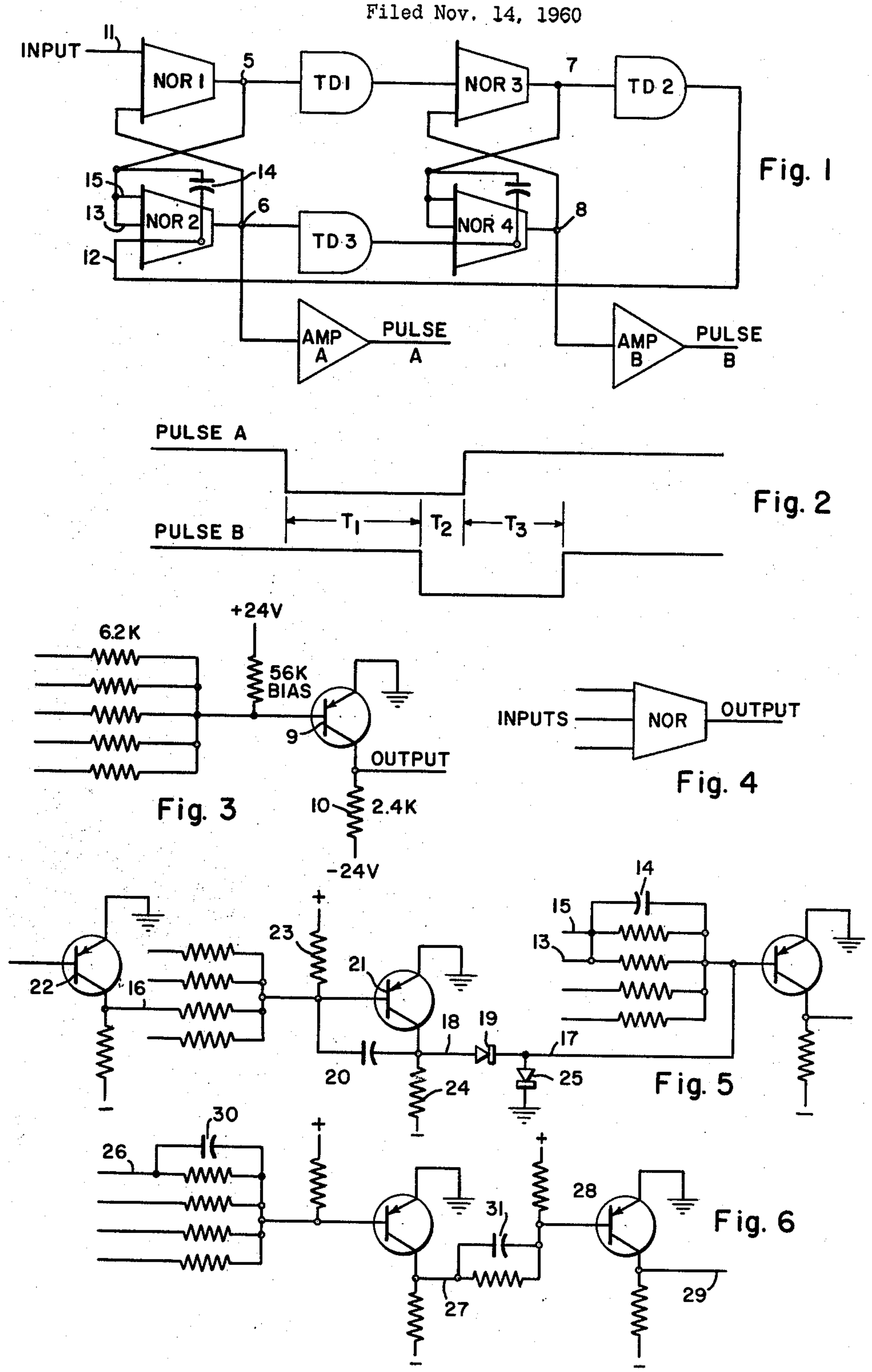
FIGURE 1 is a schematic circuit diagram showing the interconnections of the NOR circuits, the time delay circuits and the amplifiers responsive to a single incoming pulse for propagating the pair of synchronized pulses for fulfilling the objects of this invention.
FIG. 2 is a graphical representation of the pulses propagated by the circuit arrangement of FIG. 1 showing the timing relationship thereof.
FIG. 3 is a schematic circuit diagram showing one well known form of the NOR circuit and giving, by way of example, certain representative values of the components thereof.
FIG. 4 is the symbol used to represent the NOR circuit of FIG. 3.
FIG. 5 is a schematic circuit diagram showing details of the time delay circuits, and more particularly the circuits symbolized as TD–2 and TD–3 in FIG. 1.
FIG. 6 is a schematic circuit diagram showing details of the amplifier circuits symbolized as AMP–A and AMP–B in FIG. 1.

The operation of the circuit of the present invention may be followed in general from the schematic of FIG. 1 and the graphs of FIG. 2. When an input of any duration from a minimal period required to cause the operation of the circuit of NOR 1 is applied to the input of NOR 1, its output 5 will move from a normal negative signal to a ground potential and the output 6 of its companion NOR 2 will simultaneously move from ground potential to a negative signal.

In response to the movement of the output 6 to a negative value the amplifier AMP–A will produce a pulse A, as indicated in FIG. 2, and this impulse will persist until the NOR 1 and NOR 2 are driven back to their original and normal states.

In response to the movement of the output 5 from a negative value to ground, the time delay circuit TD–1, which may be a well known variation of a NOR circuit, will drive its output within a precisely timed interval from a normal ground potential to a negative signal for application to an input of NOR 3.

NOR 3 and NOR 4 will now switch in the same manner that NOR 1 and NOR 2 responded to the said input signal. Output 7 will move from a negative signal to a ground or zero value and output 8 will move in the other direction, that is, from ground to a negative signal whereby amplifier AMP–B will produce pulse B, as shown in FIG. 2.

Responsive to the change of potential at output 7, the TD–2 time delay circuit will be triggered into operation and will after a precisely timed interval change its output from a normal ground or zero value to a negative signal potential, which applied to an input of NOR 2 will drive the output 6 thereof from a negative signal potential to a ground or zero value. This acts to terminate the operation of AMP–A which therefore terminates pulse A.

The movement of the output 6 from a negative value to zero will trigger the third time delay circuit TD–3 so that after another precisely timed interval, $T_3$, the NOR 3 and NOR 4 circuits will be returned to normal and the amplifier AMP–B will be signalled to terminate pulse B. In this manner, a pair of overlapping and precisely timed pulses, as shown in FIG. 2, may be propagated and transmitted.

It may be noted that the time delay produced by the TD–1 circuit extends over the period $T_1$, after which NOR 3 and NOR 4 are switched and the period of operation of AMP–A is extended by the interval $T_2$ taken for the TD–2 circuit to produce its output after being triggered. Likewise, upon the switching of NOR 4, the AMP–B will go into operation which is maintained first through the interval $T_2$ required for the TD–2 circuit to produce an output and thereafter for the TD–3 circuit to produce an output after NOR 2 has been switched back to normal by the operation of TD–2.

The internal circuitry and the mode of operation of the various components shown in FIG. 1 and operated in the manner above described, may be followed from the following descriptions. FIG. 3 shows a well known and conventional NOR circuit, symbolized in FIG. 4, which may consist essentially of a plurality of inputs connected in parallel to the positively biased base of a grounded emitter PNP transistor. The single output of this NOR circuit is normally at a signal condition, but is driven to a not signal condition when the transistor is driven to saturation. When any one or more of the inputs of the NOR circuit is switched ON by the application thereto of a negative potential such negative potential drives the transistor to saturation and the normally negative collector moves to ground potential through the conduction of holes from the emitter to the base, some 95% of which pass through the base into the collector. The collector of the transistor constitutes the output of the NOR circuit and hence negative potential thereon represents a signal condition and a ground potential represents a not signal condition.

In a PNP transistor, holes constitute the majority carriers and hence when (in a grounded emitter circuit) the base is driven negatively, the current flow is from ground to base and this current consists of the movement of the positive charges. Since the great majority of such positive charges which succeed in crossing the barrier between the emitter and the base are then attracted to the much more negative potential of the collector than that presented by the incoming negative signal on the base, the principal current flow is from emitter to collector, returning to ground through the collector battery. Since substantially all of the resistance in this circuit is in the load resistor 10, the output becomes substantially zero or ground potential.

A pair of NOR circuits interconnected as the NOR 1 and NOR 2 of FIGURE 1 will operate as a bistable memory circuit. The outputs 5 and 6 may be termed the signal and not signal outputs since the terminal 5 will normally show a negative potential and the terminal 6 will normally show a ground potential. The input 11 may be termed the ON input for when it is driven negatively, NOR 1 will be driven into operation whereby output 5 will be moved to the not signal or ground condition and the output 6 will be moved to the signal or negative potential condition. As explained hereinabove, the signal condition on terminal 6 places the amplifier A into operation and the not signal condition causes the time delay TD–1 circuit to propagate, after a predetermined interval, a signal on its output. The input 12 may be termed the OFF input of the bistable memory circuit for when a signal potential is connected thereto the conditions of the output terminals 5 and 6 will be reversed and a signal condition will appear on terminal 5 and a not signal condition will appear on terminal 6.

Where a pair of NOR circuits are interconnected, as shown in FIG. 1, to form a bistable memory circuit, the output of one, for example NOR 1 shown in FIGURE 1, may be connected to the inputs 13 and 15 of the other, for example NOR 2, which in turn are connected with a speed-up condenser 14 to the base of the transistor as shown in FIGURE 5. This arrangement increases the speed of operation of the NOR circuit as already known in this art and conventional practice at the present time.

The time delay circuit, symbolized as TD–1, TD–2 and TD–3 in FIG. 1, is a circuit constructed along the lines of a NOR circuit terminating in a Zener diode used to hold off the application of a negative potential or signal condition until the slowly increasing negative potential has reached a given value at which the Zener breakdown occurs. Such a circuit is shown in FIG. 5 to illustrate one of TD–2 or TD–3 shown in FIG. 1.

The time delay circuit consists of that part of the circuit of FIG. 5 from and including the input wire 16 and the output wire 17. The portion of the circuit from input 16 to the output 18 is a conventional NOR circuit, such as that shown in FIG. 3, with the addition of a capacitor 20 connected from the base to the collector of its transistor 21. When the transistor 22 of another NOR circuit moves from cut off to saturation and the input 16 relieves the transistor 21 so that it may move from saturation to cut off, the output 18 will become increasingly more negative. The potential of the output 18 moves slowly from ground to the signal value by virtue of the charging of condenser 20 in the R–C time constant circuit including the condenser 20 and the resistors 23 and 24. However, the Zener diode 19 prevents the communication of this slowly increasing negative potential to the input 17 of a next in line circuit until a critical value is reached whereupon the Zener breakdown occurs and a negative signal is placed on the input 17, which is connected to the base of the next successive transistor as shown in FIGURE 5. The silicon diode 25 is used to clamp the base a few tenths of a volt above ground in order to stabilize the voltage at which the Zener diode 19 conducts.

FIG. 6 shows the amplifier symbolized as AMP–A and AMP–B in FIG. 1. This consists essentially of a NOR circuit from input 26 to output 27 to drive a power transistor 28 which moves the output 29 to correspond to the input 26. Thus, when the input 26 is driven to a negative signal condition, the output 27 moves to a ground potential whereupon the power transistor 28 goes from saturation to cut off and the output 29 goes from ground to a negative signal potential.

The use of capacitively coupled inputs provided by the condensers 30 and 31 reduce the effects of hole-storage time and generally speed up the response of the transistors to the incoming pulses.

Although the present invention has been described with a certain degree of particularity, it should be understood that the present disclosure has been made only by way of example and that numerous changes in the details of construction and the combination and arrangement of parts may be resorted to without departing from the scope and the spirit of the present invention.

We claim as our invention:

1. A circuit arrangement responsive to a single incoming control pulse including an amplifier responsive to said incoming control pulse for propagating a first outgoing pulse, a first time delay circuit responsive to said incoming control pulse for propagating after a predetermined interval a second control pulse, an amplifier responsive to said second control pulse for propagating a second outgoing pulse, a second time delay circuit responsive to said second control pulse for propagating after a second predetermined interval a third control pulse, means responsive to said third control pulse for terminating the operation of said first amplifier, and a third time delay circuit responsive to said third control pulse for propagating after a third predetermined interval a fourth control pulse, and means responsive to said fourth control pulse for terminating the operation of said second amplifier.

2. A circuit arrangement including a plurality of bistable memory circuits each having an ON and an OFF input connection and a pair of signal and not signal output connections responsive in an OFF condition to a signal pulse transmitted over said ON input and responsive in an ON condition to a signal pulse transmitted over said OFF input to reverse in each said operation the opposed output conditions on said signal and not signal outputs, a plurality of amplifier circuits each connected to a not signal output of one of said bistable memory circuits and responsive to a signal condition thereon to propagate an outgoing pulse, and a plurality of time delay circuits each having an input circuit and an output circuit responsive to a not signal condition on its input to propagate and transmit after a predetermined time interval a signal condition over its said output circuit, said bistable memory circuits being interconnected through said time delay circuits to be responsive to an incoming pulse transmitted over an ON input of a first bistable memory circuit to propagate a first outgoing pulse and after a predetermined time delay a second outgoing pulse, to terminate said first outgoing pulse and to terminate said second outgoing pulse.

3. A circuit arrangement including a plurality of NOR circuits, a first group of said NOR circuits being connected in pairs to provide bistable memory operation, a second group of NOR circuits being operative with Zener diodes to provide time delay operation, and a third group of NOR circuits being cascaded into additional transistors to provide amplifier operation, said bistable memory circuits, said time delay circuits and said amplifier circuits being interconnected to respond to a single incoming control pulse to propagate a pair of overlapping outgoing pulses.

4. A circuit arrangement including a plurality of NOR circuits, each consisting of a plurality of inputs multipled to the positive biased base of a PNP grounded emitter transistor circuit, a first group of said NOR circuits being connected into two pairs of NOR circuits and with each pair including an output of a first NOR connected to an input of a second NOR to provide bistable operation memory circuits, a second group of said NOR circuits each having a capacitor connected from the base to the collector thereof and a Zener diode in the output thereof to provide time delay operation, and a third group of said NOR circuits being cascaded into additional transistors to provide amplifier circuits, a first pair of said NOR circuits being connected to a second of said pairs through NOR circuits of said second group to respond to a single incoming control pulse for changing the stable operation of said memory circuits, with one of said amplifier circuits being operative with each of said memory circuits to propagate a pair of overlapping outgoing pulses.

5. In a circuit arrangement including a plurality of flip-flops and amplifiers interconnected and arranged to respond to a single minimum length incoming pulse to time delay circuits for timing the duration and the time at which said outgoing pulses overlap, each said time delay circuit consisting of an input circuit connected to the positive biased base of a PNP transistor having a capacitor connected between the base and the collector thereof, a load resistor and a negative source of signal current connected to the collector thereof, a Zener diode connected to the collector of said transistor and an output connected to said Zener diode whereby a negative incoming signal applied to said input will result after a predetermined interval responsive to the charging of said capacitor to a predetermined value in the Zener breakdown of said Zener diode and the appearance of a negative signal on said output.

6. A time delay circuit consisting of an input circuit connected to the positive biased base of a PNP transistor having a capacitor connected between the base and the collector thereof, a load resistor and a negative source of signal current connected to the collector thereof, a Zener diode connected to the collector of said transistor and an output connected to said Zener diode whereby a negative incoming signal applied to said input will result after a predetermined interval responsive to the charging of said capacitor to a predetermined value in the Zener breakdown of said Zener diode and the appearance of a negative signal on said output.

7. A circuit arrangement including a plurality of flip-flops each having a pair of separate input circuits to operate the said flip-flop to an ON and an OFF condition respectively and a pair of output circuits for exhibiting a signal and a not signal condition, said conditions being interchanged on said outputs when said flip-flop is driven from a normal OFF condition to an ON condition, an amplifier responsive to a signal condition connected to said normal not signal output and a time delay circuit responsive to a not signal condition connected to said normal signal output for response to an operation of said flip-flop to start the propagation of an output pulse and simultaneously to start the timing of said pulse, another circuit component of the same construction and arrangement having a flip-flop whose ON circuit is responsive to the output of said first time delay circuit for starting the propagation of a second outgoing pulse and simultaneously to start the timing of said second outgoing pulse, the said time delay circuit of said second component being connected to the OFF input of said flip-flop of said first component, and a third time delay circuit responsive to a not signal condition on said normal not signal output of said first flip-flop thereby responsive to the output of said second time delay circuit to time the termination of said outgoing pulses.

References Cited in the file of this patent

UNITED STATES PATENTS

| | | |
|---|---|---|
| 2,860,258 | Hall | Nov. 11, 1958 |
| 2,956,180 | James | Oct. 11, 1960 |
| 2,977,576 | Mayo | Mar. 28, 1961 |

FOREIGN PATENTS

| | | |
|---|---|---|
| 1,182,913 | France | Jan. 19, 1959 |